(12) United States Patent
Pease et al.

(10) Patent No.: US 7,097,554 B2
(45) Date of Patent: Aug. 29, 2006

(54) ANIMAL FETUS BLOOD PROCUREMENT TABLES AND METHODS

(75) Inventors: Jeffrey L. Pease, Smithfield, UT (US); Gary Graetz, Smithfield, UT (US); Elmer L. Branson, Carter Lake, IA (US)

(73) Assignee: Hyclone Laboratories, Inc., Logan, UT (US)

( * ) Notice: Subject to any disclaimer, the term of this patent is extended or adjusted under 35 U.S.C. 154(b) by 376 days.

(21) Appl. No.: 10/735,530

(22) Filed: Dec. 12, 2003

(65) Prior Publication Data

US 2005/0130574 A1 Jun. 16, 2005

(51) Int. Cl.
*A22C 17/00* (2006.01)
(52) U.S. Cl. ..................................... 452/194
(58) Field of Classification Search ............... 452/194, 452/185, 187
See application file for complete search history.

(56) References Cited

U.S. PATENT DOCUMENTS

| 4,004,322 | A | * | 1/1977 | Spendlove | 424/531 |
| 6,190,368 | B1 | * | 2/2001 | Kuypers et al. | 604/317 |
| 6,440,110 | B1 | * | 8/2002 | Kuypers et al. | 604/317 |

OTHER PUBLICATIONS

System for extracting blood from a bovine fetus, photographs 1-6, Hyclone Laboratories, Inc., Nov. 2002.

* cited by examiner

*Primary Examiner*—Thomas Price
(74) *Attorney, Agent, or Firm*—Workman Nydegger

(57) ABSTRACT

A method for extracting blood from animal fetus includes securing a placenta of an animal against a substantially planar face, the first face being disposed at an angle in a range between about 45° to about 110° relative to the horizontal. The placenta is massaged against the first face so that at least a portion of the blood within the placenta flows out of the placenta through an umbilical cord and into the animal fetus. The animal fetus is then suspended. At least a portion of the blood within the animal fetus is then drained from the fetus into a container.

13 Claims, 5 Drawing Sheets

ANIMAL FETUS BLOOD PROCUREMENT TABLES AND METHODS

CROSS-REFERENCE TO RELATED APPLICATIONS

Not applicable.

BACKGROUND OF THE INVENTION

1. The Field of the Invention

The present invention relates to table systems and corresponding methods for use in procuring blood from animal fetuses.

2. The Relevant Technology

The growing of cells is a process used extensively by researches in a variety of different biological areas. Biopharmaceutical companies also use cell growth in the development of various medications such as vaccines. Cells are grown in a nutrient medium in which serum is added. Serum is a blood product. Specifically, serum is produced by initially allowing blood to clot. The clotted portion of the blood is then removed through a centrifuge. The remaining clear fluid portion of the blood is serum.

Although serum can be derived from the blood of all animals, it has been found that serum derived from a fetus has enhanced properties for cell growth. In part, this is because the serum derived from a fetus is high in growth factors and hormones which enhances cell growth. Accordingly, animal fetuses are a preferred source for serum. Animal fetuses are commonly encountered during the traditional slaughter of cattle, sheep, pigs, horses, and the like.

Procedures for extracting the blood from such fetuses has historically entailed laying the fetus flat on a table outside of the placenta and inserting a needle into the heart of the animal. A pump is then used to suck the blood out of the fetus through the needle.

Although conventional processes are productive in extracting some of the blood of the fetus, conventional processes are relatively slow and fail to recover a substantial portion of the blood.

Accordingly, what is needed are improved systems and methods for more efficient harvesting of a larger percentage of the blood from an animal fetus.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The present invention relates to methods and systems for procuring blood from an animal fetus. The term "animal fetus" is intended to broadly include the unborn organism of any non-human mammal such as the fetus of a pig, cow, horse, sheep, or the like. Typically, such animal species from which the fetus is harvested are selected from the species of mammals for which the grown animal itself is harvested on a large scale for the purpose of producing human food and/or other purposes.

Figure 1:
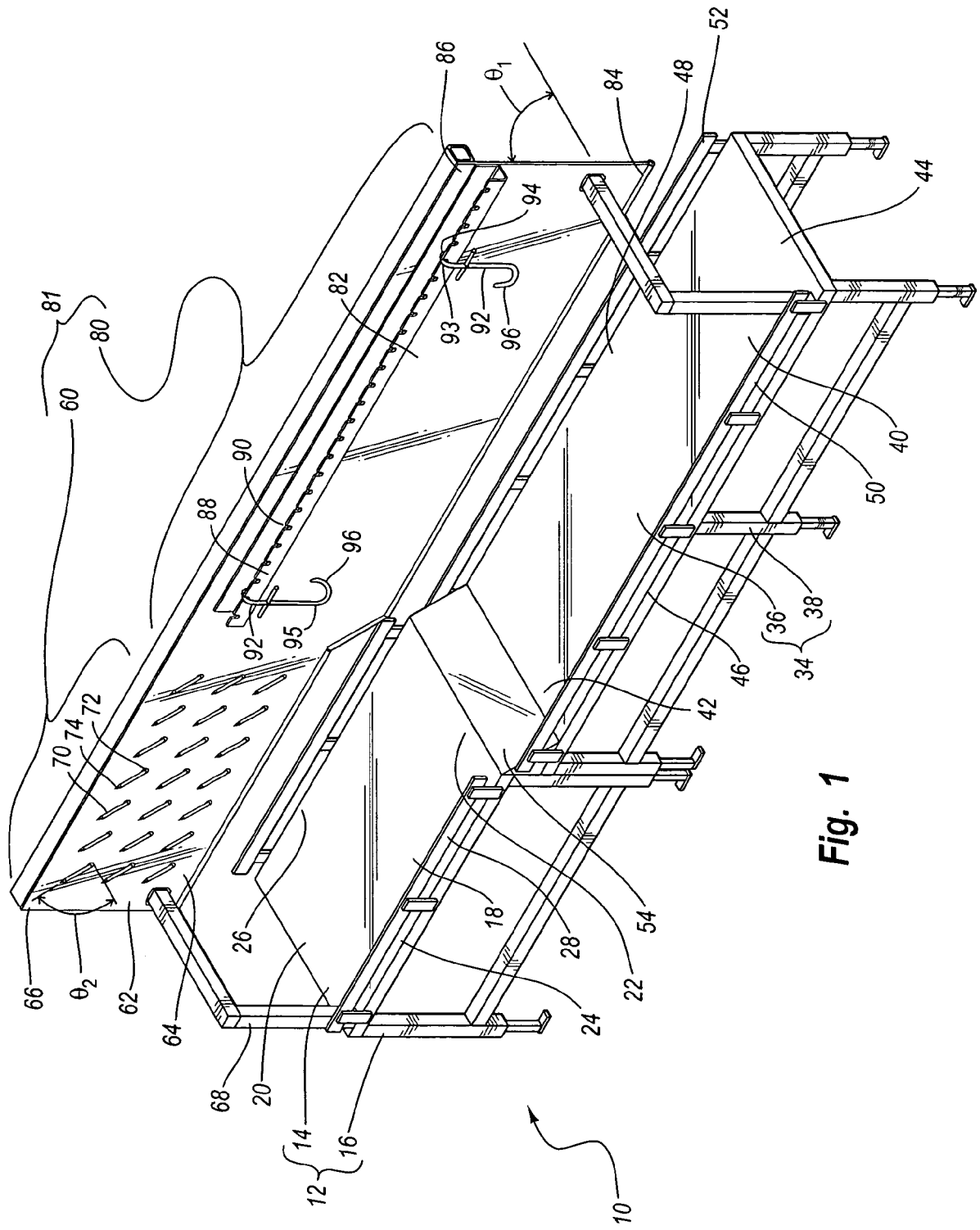
FIG. 1 is a perspective view of one embodiment of a table system for use in procuring blood from an animal fetus.

Depicted in FIG. 1 is a perspective view of one embodiment of a table system 10 incorporating features of the present invention. Table system 10 comprises a first table 12 having a first table top 14 and a plurality of legs 16. Legs 16 downwardly project from first table top 14 so as to support table top 14 off the ground. Legs 16 can be fixed or adjustable to selectively control the height of table top 14. Table top; 14 has a substantially planer top surface 18 that extends between a first end 20 and an opposing second end 22. First table top 14 also has a front edge 24 and an opposing back edge 26. Upstanding along front edge 24 and back edge 26 is a front rail 28 and a back rail 30, respectively.

Table system 10 further includes a second table 34 having a second table top 36 and a plurality of legs 38. Legs 38 also project from table top 36 so as to support table top 36 off of the ground. Table top 36 has a substantially planer top surface 40 which extends between a first end 42 and an opposing second end 44. Second table top 36 also has a front edge 46 and an opposing back edge 48. Upstanding from front edge 46 and back edge 48 is a front rail 50 and a back rail 52, respectively. The various rails 24, 30, 50, and 52 are optional but when used typically extend up in a range between about 5 cm to about 15 cm. Other dimensions can also be used.

In alternative embodiments, it is appreciated that first table 12 and second table 34 can comprise separate and discrete tables which are either spaced apart or connected together. Alternatively, first table 12 and second table 34 can comprise portions of a single integral table. To facilitate ease in cleaning and sterilization between uses, tables 12 and 34 are typically comprised of stainless steel wherein discrete parts are welded together. In alternative embodiments, tables 12 and 34 can be made of other materials that can be sterilized such as other metals, plastics, composites, combinations thereof and the like. Other conventional connectors can also be used to assemble the tables.

For reasons as will be discussed below in greater detail, in the embodiment depicted top surface 18 of first table top 14 is disposed at a first elevation while top surface 40 of second table top 36 is disposed at a second elevation. The second elevation is lower than the first elevation. For example, in one embodiment top surface 18 is disposed off of the ground surface at an elevation in a range between about 70 cm to about 84 cm while top surface 40 is disposed at an elevation in a range between about 53 cm to about 66 cm. Other dimensions can also be used. In alternative embodiments, top surfaces 18 and 40 can be disposed at the same elevation.

To assist in the transition between table tops 14 and 36 having different elevations, a sloping ramp 54 extends between second end 22 of first table top 14 and first end 42 of second table top 36. First table 12 and second table 34 are depicted in FIG. 1 as being connected together with the transition of ramp 54. In alternative embodiments, it is appreciated that tables 12 and 34 can be spaced apart from one another without a connecting transition. In another alternative, tables 12 and 34 can be connected together but have a sharp shoulder at the connection as opposed to a gradual ramp.

Disposed above first table 12 is a first panel 60 having a front face 62. The term "panel" is intended to broadly include a wall, substantially rigid sheet, panel, a board or board-like structure, and any other at least substantially rigid structure having a face that can function for the purposes as disclosed herein. First panel 60 extends along the length of first table 12 and has a lower edge 64 and an opposing upper edge 66. In one embodiment, upper edge 66 has a height above ground surface in a range between about 175 cm to about 190 cm. Lower edge 64 can extend all the way to first table top 14 or be disposed above table top 14 at a distance in a range between 30 cm to about 55 cm. Other dimensions can also be used.

In the embodiment depicted, front face 62 is disposed at an angle $\theta_1$ which is 90° relative to the horizontal. In alternative embodiments, front face 62 and/or first panel 60 can be oriented at the angle $\theta_1$ at a range between about 45° to about 110° and more commonly between about 85° to about 95°. First panel 60 can be mounted directly against or be comprised of a portion of a wall. In other embodiments, panel 60 can be supported within a room such as being mounted to a ceiling and/or by brackets 68 extending from first table 12.

In one embodiment of the present invention, means are provided for securing a placenta of an animal fetus substantially flat against front face 62 of first panel 60. By way of example and not by limitation, outwardly projecting from front face 62 are a plurality of spikes 70. As discussed below in greater detail, spikes 70 are passed through the placenta of the animal fetus to secure the placenta to front face 62. Each spike 70 comprises an elongated shaft having a first end 72 mounted to first panel 60 and a freely disposed, sharpened second end 74. In one embodiment, spike 70 has a diameter in a range between about 5 mm to about 15 mm with about 7 mm to about 13 mm being more common. Other dimensions can also be used. Spike 70 has a length in a range between about 6 cm to about 14 cm with about 8 cm to about 12 cm being more common. Other dimensions can also be used.

Each spike 70 typically outwardly projects at an angle $\theta_2$ relative to the horizontal in a range between about 30° to about 60°. Other angles can also be used. To facilitate ease in sterilizing panel 60 and spikes 70, panel 60 and spikes 70 are typically comprised of stainless steel with spikes 70 being welded to panel 60. In alternative embodiments, panel 60 and spikes 70 can be made of other materials that can be sterilized such as other metals, plastics, composites, combinations thereof and the like. Other conventional forms of connectors can also be used to secure spikes 70 to panel 60.

Although any number of spikes 70 can be used, in one embodiment the number of spikes 70 is at least 4, more commonly at least 10, and even more commonly at least 15. Spike 70 are vertically and horizontally spaced apart. In one embodiment, the spacing both vertically and horizontally is in a range between about 10 cm to about 25 cm and is more commonly greater than 12 cm. The spacing is preferably sufficient to enable a user to easily place his or her hand or hands between spikes 70 to contact the placenta without risk of catching on spikes 70. This spacing of spikes 70 can be in aligned rows and columns or can be random. Although spikes 70 are shown as being linear, in alternative embodiments portions or the full lengths of spikes 70 can be bent or curved such as in the form of a hook. Spikes 70 can also be barbed or have other features that enable them to better engage a placenta.

The present invention also envisions that there are a variety of other structures that can function as the means for securing the placenta of an animal fetus substantially flat against front face 62 of first panel 60. By way of example and not by limitation, spikes 70 can be replaced with clamps that are removably mounted on front face 62 of panel 60. The clamps can be positioned so as to extend around the perimeter of the placenta so as to secure the placenta to front face 62 in a substantially flat position. In yet another alternative, a plurality of holes can be formed through front face 62 of first panel 60. A plurality of pins each having an enlarged head can then be punctured through the placenta and then inserted into a corresponding hole so as to secure the placenta to front face 62.

Table system 10 is also comprised of a second panel 80. In the depicted embodiment, first panel 60 and second panel 80 are integrally formed to form a single continuous panel 81. In yet other embodiments, panel 60 and 80 can comprise separate discrete panels which are connected together or can comprise separate and discrete panels that are spaced apart from one another. Second panel 80 is disposed above second table 34 and has a front face 82 that extends along the length thereof. Second panel 80 also has a lower edge 84 and an upper edge 86 which can have the same positioning as discusses above with regard to edges 64 and 66. Front fact 82 can also be disposed at the same angle $\theta_1$ as previously discussed with regard to front face 62 or another angle within the same preferred ranges. Second panel 80 can be integral with first panel 60 or separate; and (if separate) can abut against or be spaced from first panel 60 generally above end 22 of surface 18 and/or generally above end 42 of surface 36.

In one embodiment of the present invention, means are provided for suspending an animal fetus above second table 34 and against front face 82 of second panel 80. By way of example and not by limitation, an elongated substantially U-shape bracket 88 is mounted on front face 82 of second panel 80 along the upper edge 86 thereof. Longitudinally space apart along bracket 88 are a plurality of notches 90.

Removably mounted within select notches 90 of bracket 88 are meat hooks 92. Each meat hook 92 comprises a first end 93 having smaller hook 94 formed thereat. Small hook 94 is configured to be selectively received within a notch 90 so as to catch on bracket 88. Notches 90 prevent unwanted longitudinal movement of meat hooks 92 along bracket 88. Each meat hook 92 also has a second end 95 with an enlarged lower hook 96. Lower hook 96, as will be discussed below, is configured to engage with the fetus so as to suspend the fetus.

In an alternative embodiments, it is appreciated that meat hooks 92 can come in a variety of different sizes, shapes, and configurations. Furthermore, it is appreciated that there are a variety of different clamps, ties, fasteners, and the like which can be used to selectively mount the meat hooks 92 to panel 80.

Figure 2:
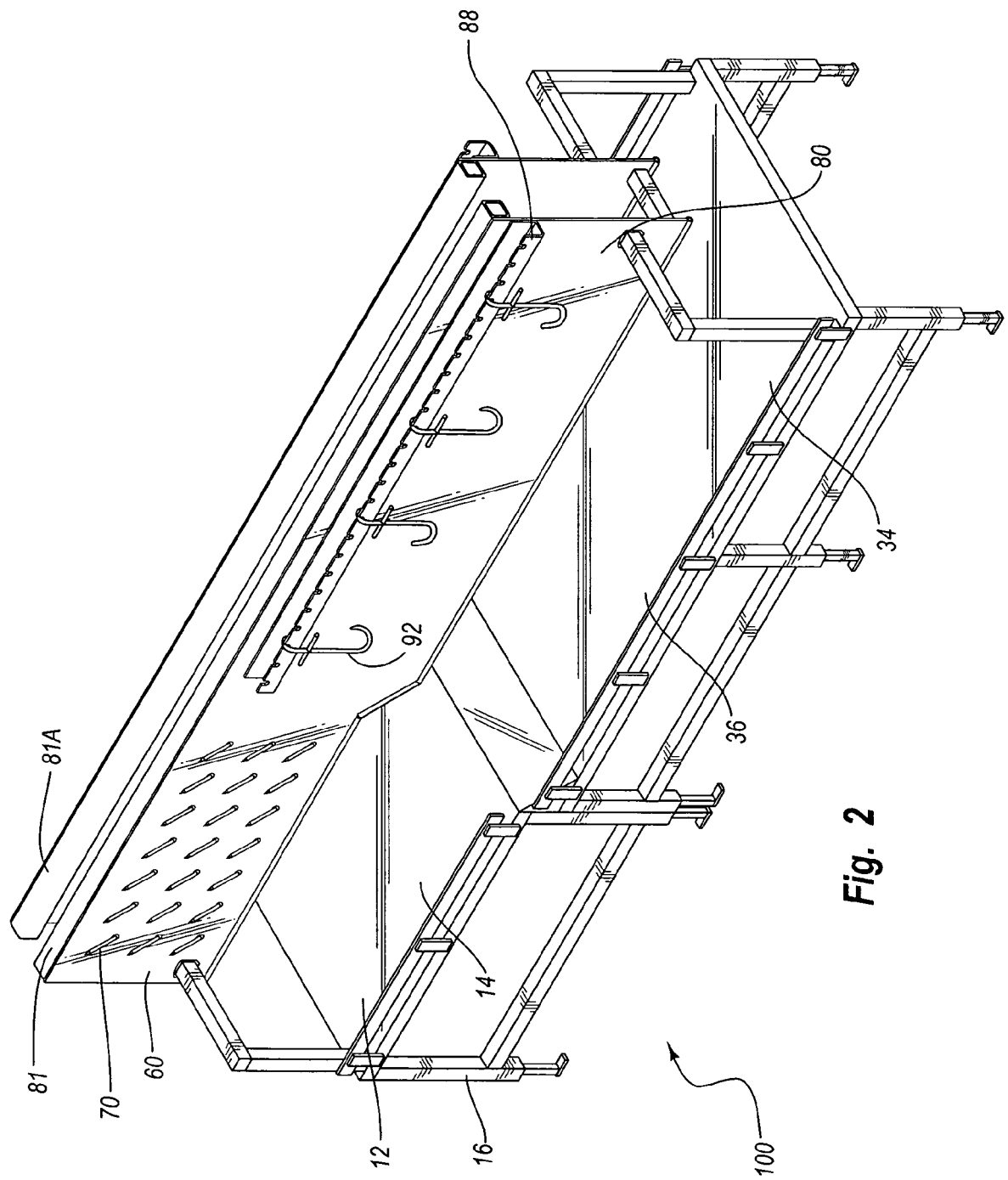
FIG. 2 is a perspective view of an alternative embodiment of the table system shown in FIG. 1.

Depicted in FIG. 2 is an alternative embodiment of a table system 100. Like elements between table system 10 and 100 are identified by like reference characters. Table system 100 includes first table 12 and second table 34. However, table tops 14 and 36 have an increased width in table system 100 relative to the configuration in table system 10. Centrally disposed above tables 12 and 34 is a first continuous panel 81 and an opposing second continuous panel 81A facing the opposing directions. Continuous panels 81 and 81A have the same configuration with spikes 70 and meat hooks 92. Accordingly, the benefit of table system 100 is that the method of operation can be simultaneously performed on both sides of table 12 and 34.

Figure 3:
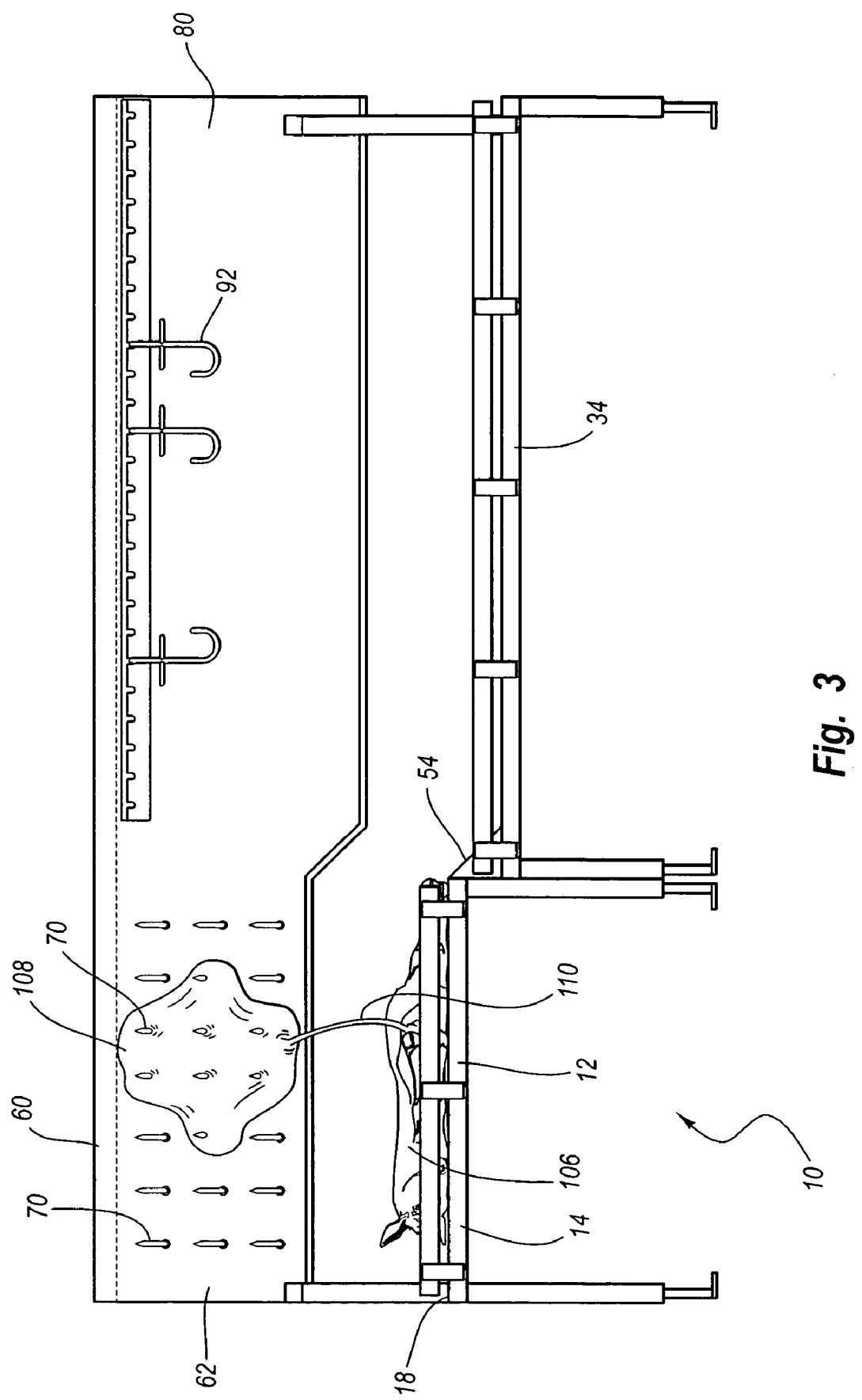
FIG. 3 is an elevated front view of the table system shown in FIG. 1 having a fetus and placenta positioned thereon.

During use, as depicted in FIG. 3, an animal fetus 106 is rested upon top surface 18 of first table top 14. Although the animal fetus can be obtained from any source, in one embodiment the animal fetus is obtained at a slaughter house. For convenience in extracting the blood, table system 10 is preferably located at the slaughter house. Fetus 106 has been recovered from a pregnant mammal with a placenta 108 which is coupled to fetus 106 through an umbilical cord 110.

Fetus 106 is typically received being contained within placenta 108. Placenta 108 is cut along the back side thereof and fetus 106 removed without cutting umbilical cord 110. With fetus 106 resting on surface 18 of first table 12, placenta 108 is secured directly against front face 62 of first panel 60 so that umbilical cord 110 substantially extends from the bottom center of placenta 108 downward to fetus 106. Other orientations of placenta 108 can also be used. This securing of placenta 108 to front face 62 is accomplished by pushing placenta 108 over spikes 70 so that spikes 70 puncture through placenta 108. In general, placenta 108 comprises tissue having a plurality of arteries and veins extending therethrough. Spikes 70 are preferably passed through the tissue so as to minimize or avoid penetrating visible blood vessels (larger arteries and veins). Furthermore, placenta 108 naturally tends to coil. Placenta 108 is preferably spread out and pushed over multiple spikes 70, so that spikes 70 retain placenta 108 in a substantially flat configuration against front face 62. As indicated above, placenta 108 is preferably oriented on front face 62 so that the connection between placenta 108 and umbilical cord 110 is located toward the bottom of placenta 108 closest to table 12.

With placenta 108 in the secured position and elevated above fetus 106, an operator can either manually or with a tool massage placenta 108 against front face 62 of first panel 60 in a downward direction so as to cause the blood within placenta 108 to flow downwardly through placenta 108, into umbilical cord 110, and into fetus 106. The term "massage" is broadly intended to include all forms of manipulation. By way of example and not by limitation, "massage" can include rubbing, stroking, kneading, tapping, and/or the like. Once all or substantially all of the blood has been moved from placenta 108 into fetus 106, umbilical cord 110 is crimped such as with an elastic, clamp, or the like and then severed. Placenta 108 is then discarded.

It has been found that by elevating the placenta in a substantially flat unfolded state and by massaging the placenta against the hard flat surface of first panel 60, the operator is able to extract a significantly larger amount of blood from the placenta in a shorter time than conventional processes.

Figure 4:
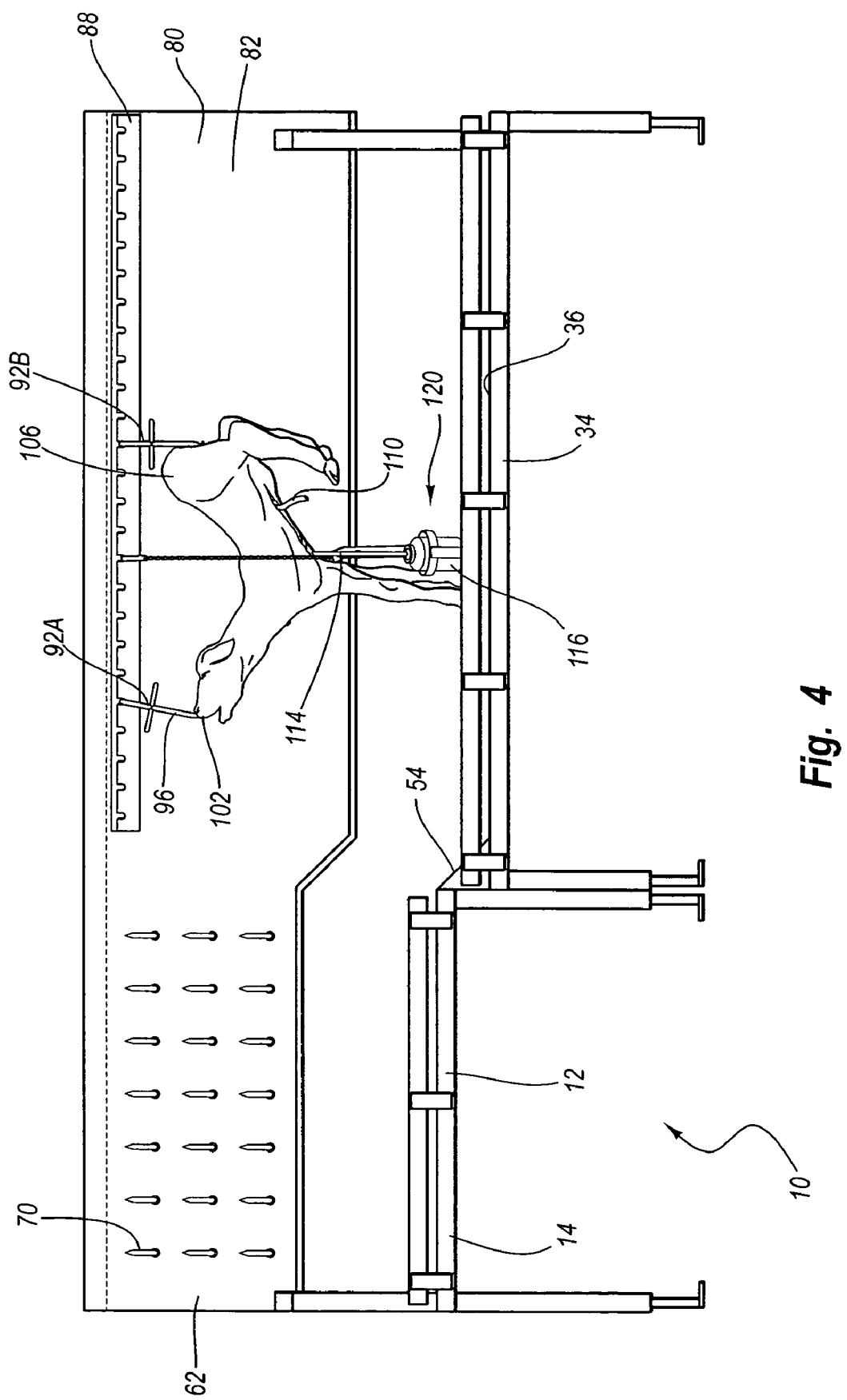
FIG. 4 is an elevated front view of the table shown in FIG. 3 showing the fetus being suspended.

Depicted in FIG. 4, once umbilical cord 110 is severed, fetus 106 is slid from first table 12, down ramp 54, and onto second table 34. Fetus 106 is then suspended against front face 82 of second panel 80. Fetus 106 is suspended so as to minimize the rupturing or constriction of any blood vessels within fetus 106. In one embodiment, this is accomplished by passing lower hook 96 of a first meat hook 92A through a nose 102 of fetus 106 and passing a lower hook 96 of a second meat hook 92B into the anus of fetus 106. Hooks 92A and 92B are then raised with the attached fetus 106 and connected to bracket 88 so that fetus 106 is suspended from hooks 92A and 92B above second table 34.

In this configuration, fetus 106 is disposed directly adjacent or against front face 82 of second panel 80 with the legs of the fetus freely extending down toward second table 34. Although not required, in one typical placement the rear end of the torso of fetus 106 is elevated relative to the chest or forward end of the torso so that the heart of fetus 106 is disposed at a low point of the fetus torso. This position assists the blood in flowing to the heart. It is appreciated that second table 34 is typically lower than first table 12 so that animal fetus 106 can be placed at a convenient working position without significantly contacting second table 34. In embodiments where table tops 14 and 36 are disposed at the same elevation, an elevated platform can be positioned in front of second table 34. The workers can then stand on the platform to have greater access to the suspended fetus.

Figure 5:
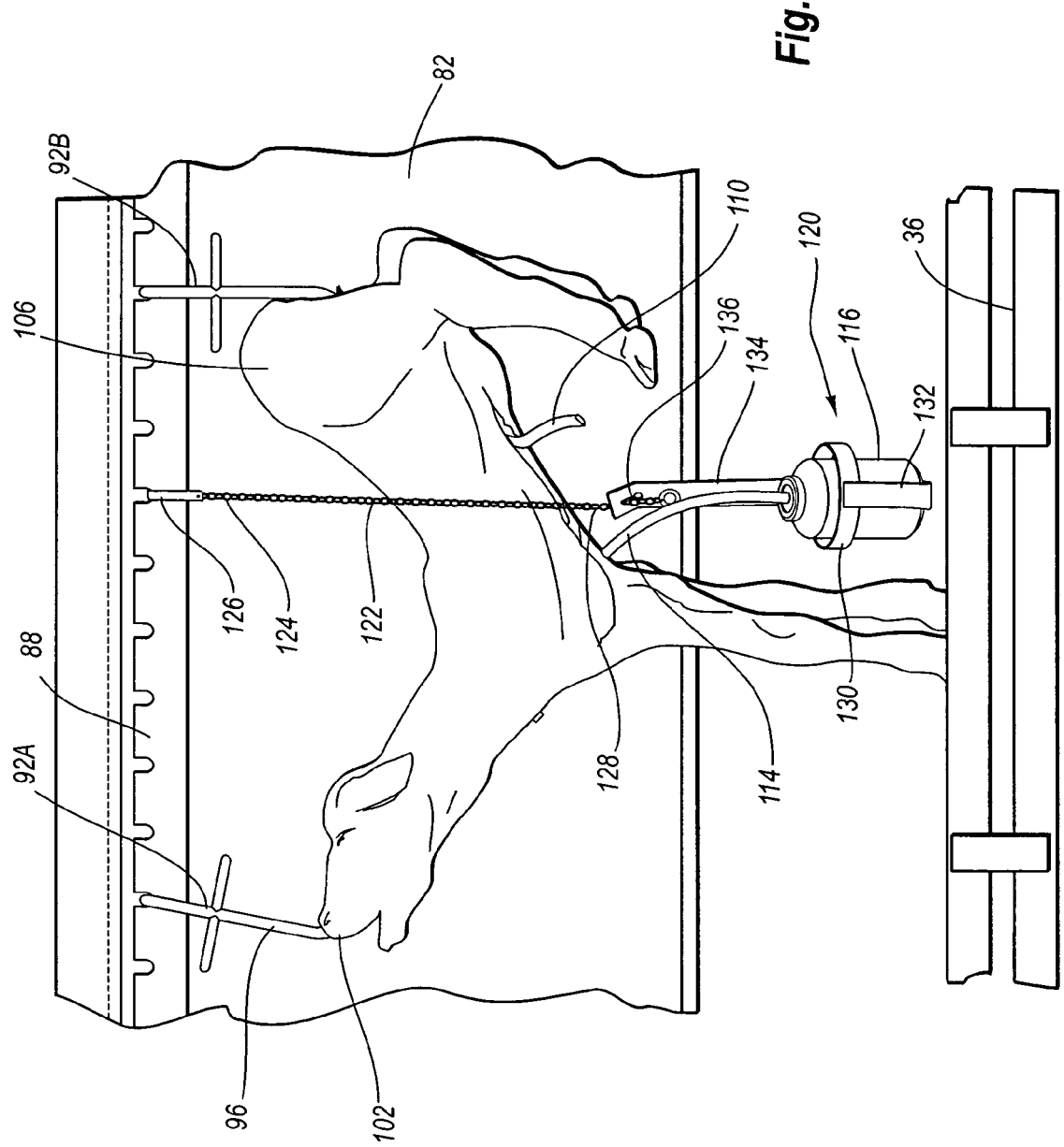
FIG. 5 is an enlarged elevated front view of the fetus with attached container shown in FIG. 4.

Either before or after suspending fetus 106, an incision is formed in the chest and a needle penetrated into the heart or other major blood vessel. A tube 114 extends in fluid communication with the needle to a container 116. Container 116 can be positioned on table top 36, suspended from table 34 or panel 80, or can be positioned at any other desired location. In the embodiment depicted, container 116 is suspended from panel 80 by a suspension assembly 120. As depicted in FIGS. 4 and 5, suspension assembly 120 includes a line 122. Line 122 can comprise a chain, rope, cord, wire, or the like. Line 122 has a first end 124 having a hook 126 mounted thereat. Hook 126 is configured to removably engage with bracket 88.

Line 122 also has a second end 128 on which a retainer 130 is adjustably mounted. Retainer 130 comprises a basket 132 having an elongated handle 134 upstanding therefrom. A retention slot 136 extends through the upper end of handle 134. Retention slot 136 tapers along the length thereof. Second end 128 of line 122 is passed through retention slot 136. By moving line 122 to the wider end of retention slot 136, line 122 can freely pass through retention slot 136 so that retainer 130 can be selectively moved up or down along line 122. Once retainer 130 is moved to the desired elevation, line 122 is slid into the narrow portion of retention slot 136, thereby capturing and securing line 122 within retention slot 136. It is appreciated that in alternative embodiments suspension assembly 120 can have a variety of different configurations.

During use, as depicted in FIG. 4, once fetus 106 is suspended, hook 127 is mounted to bracket 88 so that line 122 vertically extends down over fetus 106 in substantial alignment with the heart of fetus 106. Retainer 130 is then raised or lowered along line 122 so as to be substantially adjacent to the chest of fetus 106 vertically below the heart thereof. Container 116 having tube 114 attached thereto is received within basket 132 at some stage in the process. This positioning of container 116 limits any obstruction caused by container 116, optimizes blood from fetus 106 into container 116, and helps support the needle within fetus 106 to prevent unwanted removal. In alternative methods, as depicted in FIG. 5, it is appreciated that suspension assembly 120 can be shifted so as to be spaced apart from the heart of fetus 106.

Once in the depicted position, fetus 106 is manipulated such as by moving the legs and massaging the torso against front face 82 of second panel 80 so that pressure is applied to fetus 106 and blood is caused to flow through the veins and/or arteries of fetus 106. As blood enters the heart of fetus 106 under the applied pressure and/or gravity, the blood passes out through the needle and into container 116 through tube 114. Fetus 106 is continually manipulated and massaged until substantially all of the blood is removed from fetus 106.

In contrast to conventional methods in which a worker lays the fetus on a table for removal of the blood, it has been found that by elevating fetus 106 with the heart disposed at a low point, there is a substantial improvement in the amount of blood which can be withdrawn from the fetus and the time which it takes to remove the blood. Furthermore, mounting fetus 106 against second panel 80, as opposed to suspending fetus 106 in mid-air, has also been found to significantly improve blood harvesting. This is because use of panel 80 allows greater force to be applied against fetus 106, thus improving flow of the blood through arteries and veins to the heart and then to the collection vessel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for extracting blood from an animal fetus, the method comprising:
    securing a placenta of an animal against a panel having a substantially planar first face, the first face being disposed at an angle in a range between about 45° to about 110° relative to the horizontal, a fetus of the animal being positioned below the placenta and attached to the placenta by an umbilical cord;
    massaging the placenta against the first face so that at least a portion of the blood within the placenta flows out of the placenta through the umbilical cord and into the animal fetus;
    thereafter suspending the animal fetus; and
    draining at least a portion of the blood from the suspended animal fetus into a container.

2. A method as recited in claim 1, wherein the act of securing the placenta comprises pushing the placenta onto a plurality of spaced apart spikes projecting from the first face such that the spikes puncture the placenta.

3. A method as recited in claim 1, wherein the act of securing the placenta comprises spreading the placenta out so that the placenta rests substantially flat against the first face.

4. A method as recited in claim 1, further comprising resting the animal fetus on a first table top vertically disposed below the first face when the placenta is secured to the first face.

5. A method as recited in claim 1, further comprising severing the umbilical cord between the placenta and the animal fetus prior to suspending the animal fetus.

6. A method as recited in claim 1, wherein the act of suspending the animal fetus comprises suspending the animal fetus so that the animal fetus biases or is disposed directly adjacent to a second face, the second face being disposed at an angle in a range between about 45° to about 110° relative to the horizontal.

7. A method as recited in claim 6, wherein the act of draining the blood comprises massaging the animal fetus against the second face so as to move the blood toward the heart of the animal.

8. A method as recited in claim 7, wherein the act of draining the blood comprises inserting a needle into the heart of the animal fetus, the blood draining out of the heart through the needle and into the container.

9. A method as recited in claim 6, wherein the second face is integrally formed with or is connected to the first face.

10. A method as recited in claim 1, wherein the act of suspending comprises:
    securing a first hook to a nose of the animal fetus; and
    securing a second hook in the anus of the animal fetus, the first and second hook each being secured to the second panel.

11. A method as recited in claim 1, wherein the panel is comprised of a metal, plastic, composite, or combination thereof.

12. A method for extracting blood from an animal fetus, the method comprising:
    securing a placenta of an animal against a substantially planar first face by pushing the placenta onto a plurality of spaced apart spikes projecting from the first face such that the spikes puncture the placenta, the first face being disposed at an angle in a range between about 45° to about 110° relative to the horizontal, a fetus of the animal being positioned below the placenta and attached to the placenta by an umbilical cord;
    massaging the placenta against the first face so that at least a portion of the blood within the placenta flows out of the placenta through the umbilical cord and into the animal fetus;
    thereafter suspending the animal fetus; and
    draining at least a portion of the blood from the suspended animal fetus into a container.

13. A method for extracting blood from an animal fetus, the method comprising:
    securing a placenta of an animal against a substantially planar first face, the first face being disposed at an angle in a range between about 45° to about 110° relative to the horizontal, a fetus of the animal being positioned below the placenta and attached to the placenta by an umbilical cord;
    massaging the placenta against the first face so that at least a portion of the blood within the placenta flows out of the placenta through the umbilical cord and into the animal fetus;
    thereafter suspending the animal fetus so that the animal fetus biases or is disposed directly adjacent to a second face, the second face being disposed at an angle in a range between about 45° to about 110° relative to the horizontal, the second face being integrally formed with or connected to the first face; and
    draining at least a portion of the blood from the suspended animal fetus into a container.

* * * * *